United States Patent [19]

Takahashi

[11] Patent Number: 4,977,798
[45] Date of Patent: Dec. 18, 1990

[54] TRANSMISSION RATIO CONTROL SYSTEM FOR A CONTINUOUSLY VARIABLE TRANSMISSION

[75] Inventor: Masahiko Takahashi, Tokyo, Japan
[73] Assignee: Fuji Jukogyo Kabushiki Kaisha, Tokyo, Japan
[21] Appl. No.: 290,036
[22] Filed: Dec. 23, 1988

[30] Foreign Application Priority Data

Dec. 28, 1987 [JP] Japan .................. 62-332628

[51] Int. Cl.$^5$ ........................... B60K 41/16
[52] U.S. Cl. ........................ 74/867; 474/28
[58] Field of Search .............. 474/18, 28; 74/867, 74/868, 856, 857, 859, 870, 871, 872, 878

[56] References Cited

U.S. PATENT DOCUMENTS

| | | | |
|---|---|---|---|
| 4,627,313 | 12/1986 | Sakai | 474/28 X |
| 4,680,991 | 7/1987 | Miyawaki | 474/28 X |
| 4,730,523 | 3/1988 | Takahashi | 74/868 |

FOREIGN PATENT DOCUMENTS

| | | | |
|---|---|---|---|
| 59-175663 | 10/1984 | Japan | 74/867 |
| 0151522 | 8/1985 | Japan | 74/867 |
| 0013859 | 1/1987 | Japan | 474/28 |

Primary Examiner—Leslie A. Braun
Assistant Examiner—Khoi Q. Ta
Attorney, Agent, or Firm—Martin A. Farber

[57] ABSTRACT

A continuously variable transmission has a drive pulley having a shiftable disc, a driven pulley having a shiftable disc, a belt engaged with both pulleys, a transmission ratio control valve having a plunger slidably mounted in a valve body, a spool for controlling transmission ratio and, a spring provided between the plunger and the spool. A selector device is provided for selecting a high engine speed driving range. The selector device has an actuator responsive to the selection of the high engine speed driving range for shifting the plunger to increase the load on the spring, and a correcting lever for controlling the operation of the actuator in accordance with the transmission ratio. The correcting lever has a shape for providing a transmission ratio changing line where the transmission ratio changes with small change of the engine speed in an extreme low vehicle speed range and changes with larger change of the engine speed in a low and middle vehicle speed range than the extreme low vehicle speed range.

6 Claims, 9 Drawing Sheets

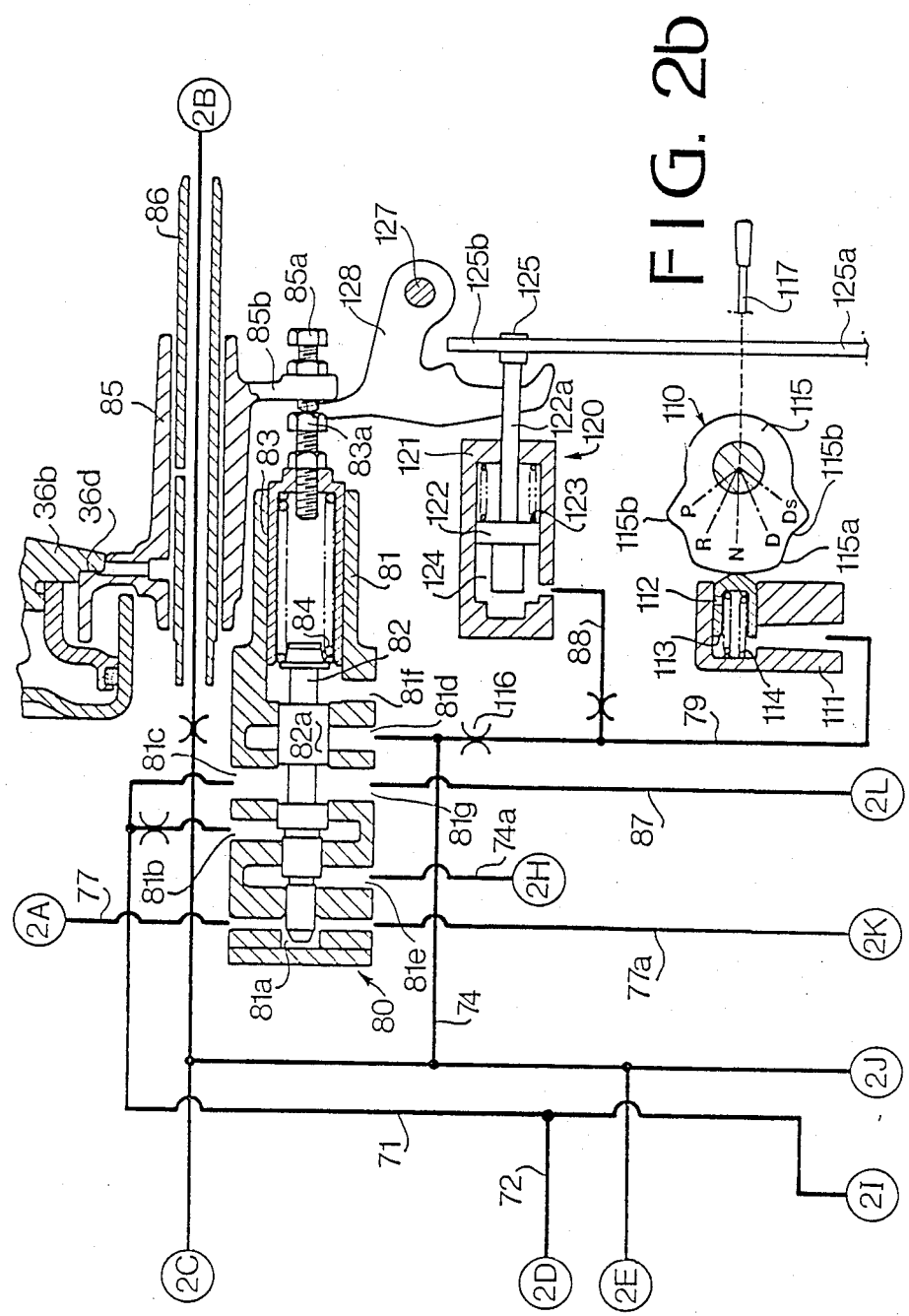

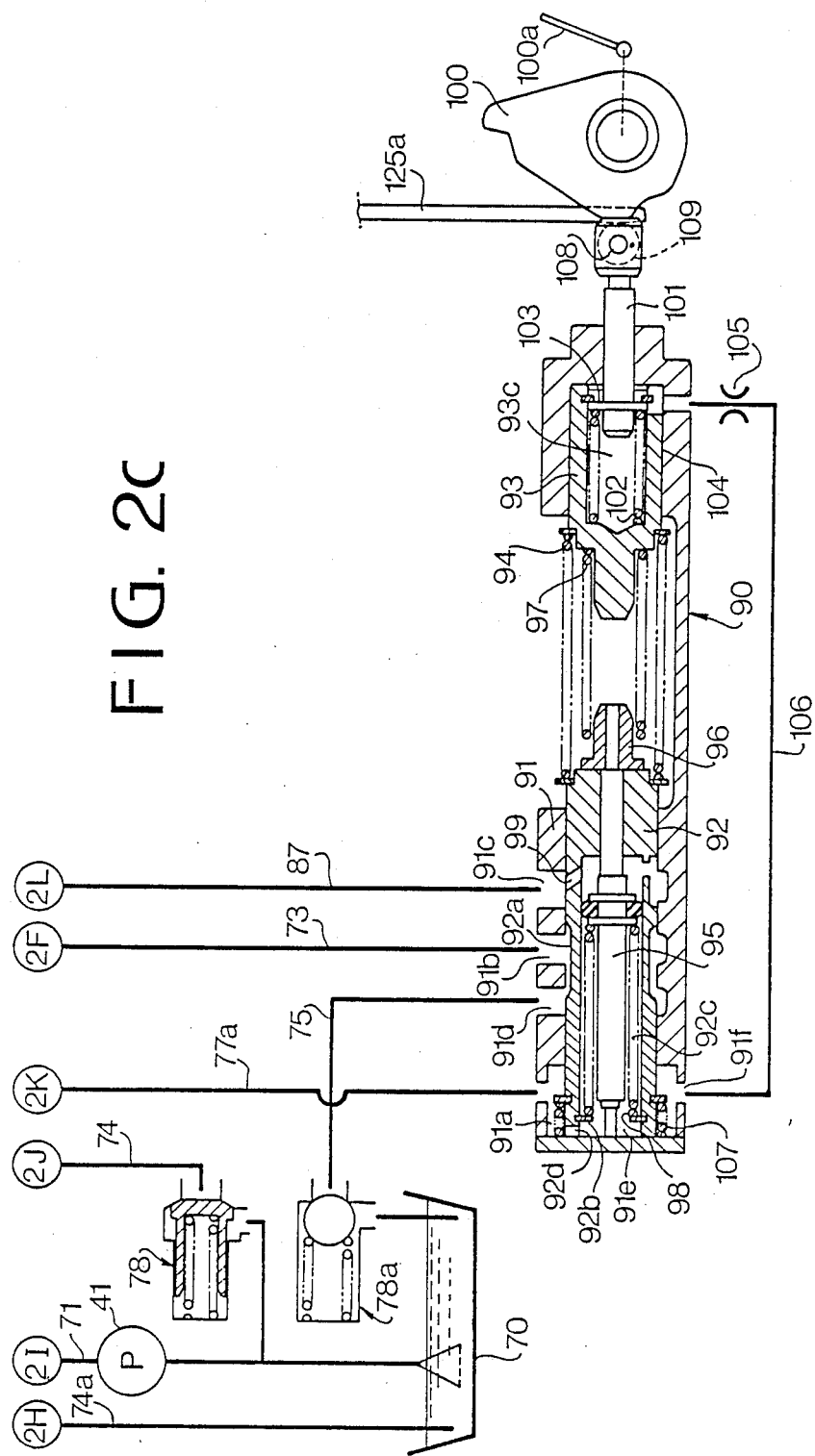

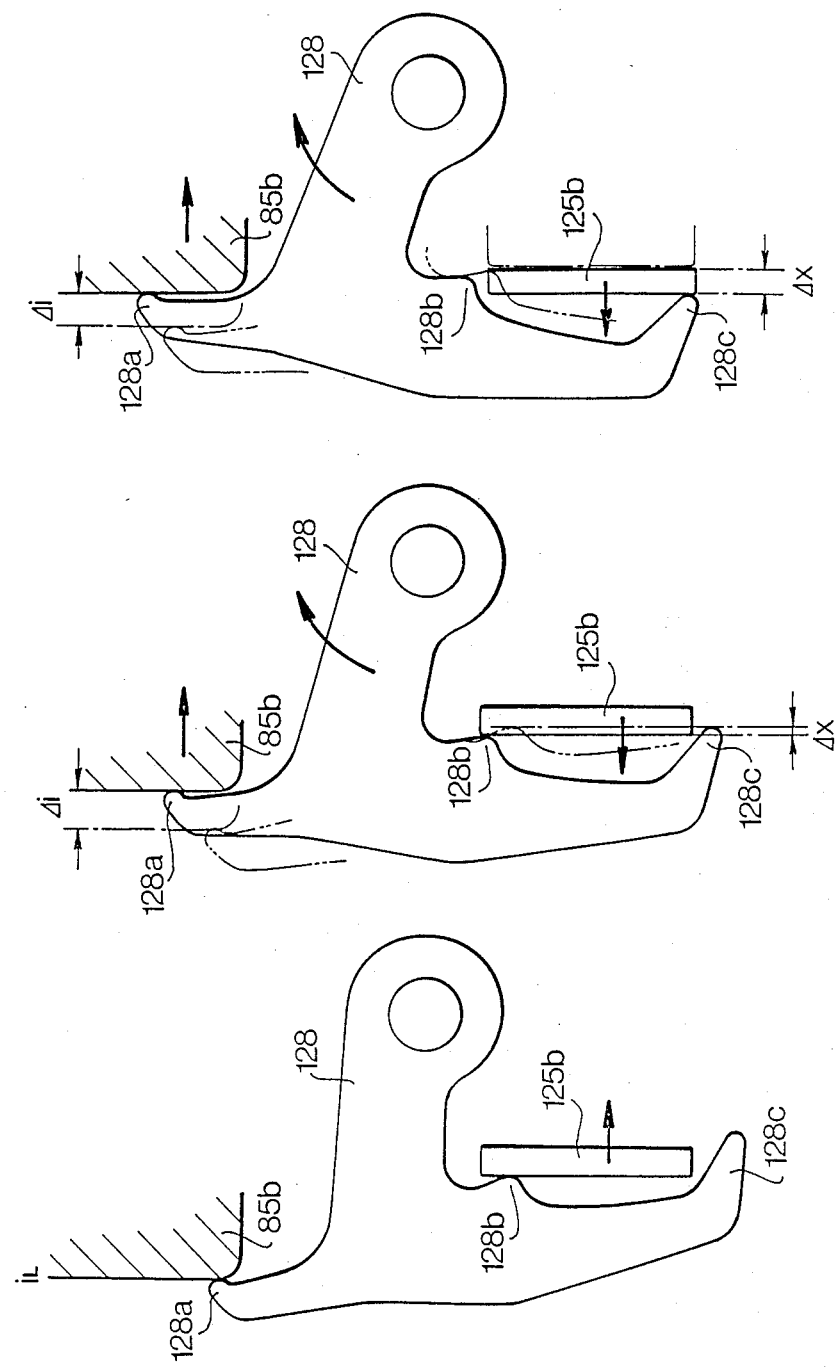

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission at an extremely low vehicle speed range when a high engine speed driving range (Ds range) is selected.

A known control system for a continuously variable belt-drive transmission comprises an endless belt running over a drive pulley and a driven pulley. Each pulley comprises a movable conical disc which is axially moved by a fluid operated servo device so as to vary the running diameter of the belt on the pulleys in dependency o driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to determine the transmission ratio in accordance with the opening degree of a throttle valve of an engine and the speed of the engine. The line pressure control valve is adapted to control the line pressure in accordance with the transmission ratio and the engine speed. The line pressure is controlled to prevent the belt from slipping on the pulleys in order to transmit the output of the engine.

When starting the vehicle, the transmission ratio is set at a maximum value. When the engine speed exceeds a predetermined value, an electromagnetic clutch engages, so that the vehicle is started. When the vehicle speed and engine speed exceed set values under a driving condition, the transmission ratio starts to change (to upshift). The transmission ratio is automatically and continuously reduced, even if the engine speed is kept constant. Thus, the vehicle speed increases with the reduction of the transmission ratio.

In a transmission ratio control system disclosed in Japanese Patent Laid-Open 61-48659, an actuator is provided for applying a certain load on a spool of the transmission ratio control valve, for providing a high engine speed driving range (hereinafter called Ds range). Accordingly, in the Ds range, the transmission ratio changes in a higher engine speed than the drive range (D range). For example, when the Ds range is selected under a driving condition where the transmission ratio changes as shown by a line $m_3$ of FIG. 6, the transmission is downshifted so as to vary as shown by a transmission ratio changing line $m_5$. Accordingly, in order to maintain the vehicle speed at that time, the engine speed must be increased. Thus, engine torque is increased, and engine braking effect is also increased. Additionally, when the transmission ratio exceeds a predetermined transmission ratio S, the load exerted on the spool by the actuator is gradually decreased by a correcting means and a changing means so that the transmission is upshifted at low engine speed as shown by a transmission ratio changing line $m_7$, thereby preventing an extreme engine braking effect.

However, in the system, the construction is complicated by the addition of the changing means.

Moreover, even though the driveability is improved in a low and middle vehicle speed range because of the reduction of the engine braking effect, in a range between a low vehicle speed and an extremely low vehicle speed slightly higher than a clutch disengagement speed, the engine braking effect is excessively large. Accordingly, the vehicle stumbles due to large engine braking or shock caused by the disengagement of the clutch.

On the other hand, the transmission system has the following function during release of an accelerator pedal in an extreme low vehicle speed range. When engine speed decreases because of an increase of load on the engine when releasing of the accelerator pedal, the transmission is downshifted by the operation of the transmission ratio control valve. The load on the engine reduces because of the downshifted ratio, so that the engine speed increases. When engine speed increases, the transmission is upshifted. When the transmission is upshifted, the load increases, thereby reducing the engine speed. The oscillation continues until a balance is made in the system. If such an oscillation of engine speed occurs, the engine speed varies greatly because of the steep inclination of the line. As a result the vehicle jerks.

SUMMARY OF THE INVENTION

The object of the present invention is to provide a transmission ratio control system which may reduce the fluctuation of engine speed and the vibration of the vehicle body at an extremely low engine speed.

According to the present invention, there is provided a control system for a continuously variable transmission for transmitting the power of an automotive engine to driving wheels of a vehicle, the system comprising a transmission comprising a drive pulley having a hydraulically shiftable disc and a hydraulic cylinder for operating the disc, a driven pulley having a hydraulically shiftable disc and a hydraulic cylinder for operating this disc and, a belt engaged with both pulleys, a hydraulic circuit having a pump for supplying oil to both the hydraulic cylinders and a drain passage for draining oil in the hydraulic cylinder of the drive pulley, a transmission ratio control valve having a plunger slidably mounted in a valve body, a spool for controlling the oil supplied to the cylinder of the drive pulley and the oil drained from the cylinder to change the transmission ratio, at least one spring provided between the plunger and the spool, and a cam operatively connected with an accelerator pedal of the vehicle for shifting the plunger of the transmission ratio control valve in accordance with depression of the accelerator pedal, shifting means for shifting the spool in dependency on the engine speed to compress the spring, thereby changing the transmission ratio of the transmission, selecting means for selecting a high engine speed driving range, the selecting means having an actuator responsive to the selection of high engine speed driving range (Ds range) for shifting the plunger to increase the load on the spring, and a correcting lever for controlling the operation of the actuator in accordance with the transmission ratio.

In accordance with the present invention, the selecting means is arranged to provide a transmission ratio changing line where the transmission ratio changes with small change of the engine speed in an extreme low vehicle speed range and changes in accordance with larger change of the engine speed in a low and middle vehicle speed range than the extreme low vehicle speed range.

In an aspect of the invention, the correcting lever has a shape to provide the transmission ratio changing line.

The other objects and features of this invention will become understood from the following description with reference to the accompanying drawings.

BRIEF DESCRIPTION OF DRAWINGS

FIGS. 2a to 2c hydraulic control circuit according to the present invention;

FIGS. 4a to 4c show plan views of the correction lever, for describing thereof.

DETAILED DESCRIPTION OF THE PREFERRED EMBODIMENT

Figure 1A:
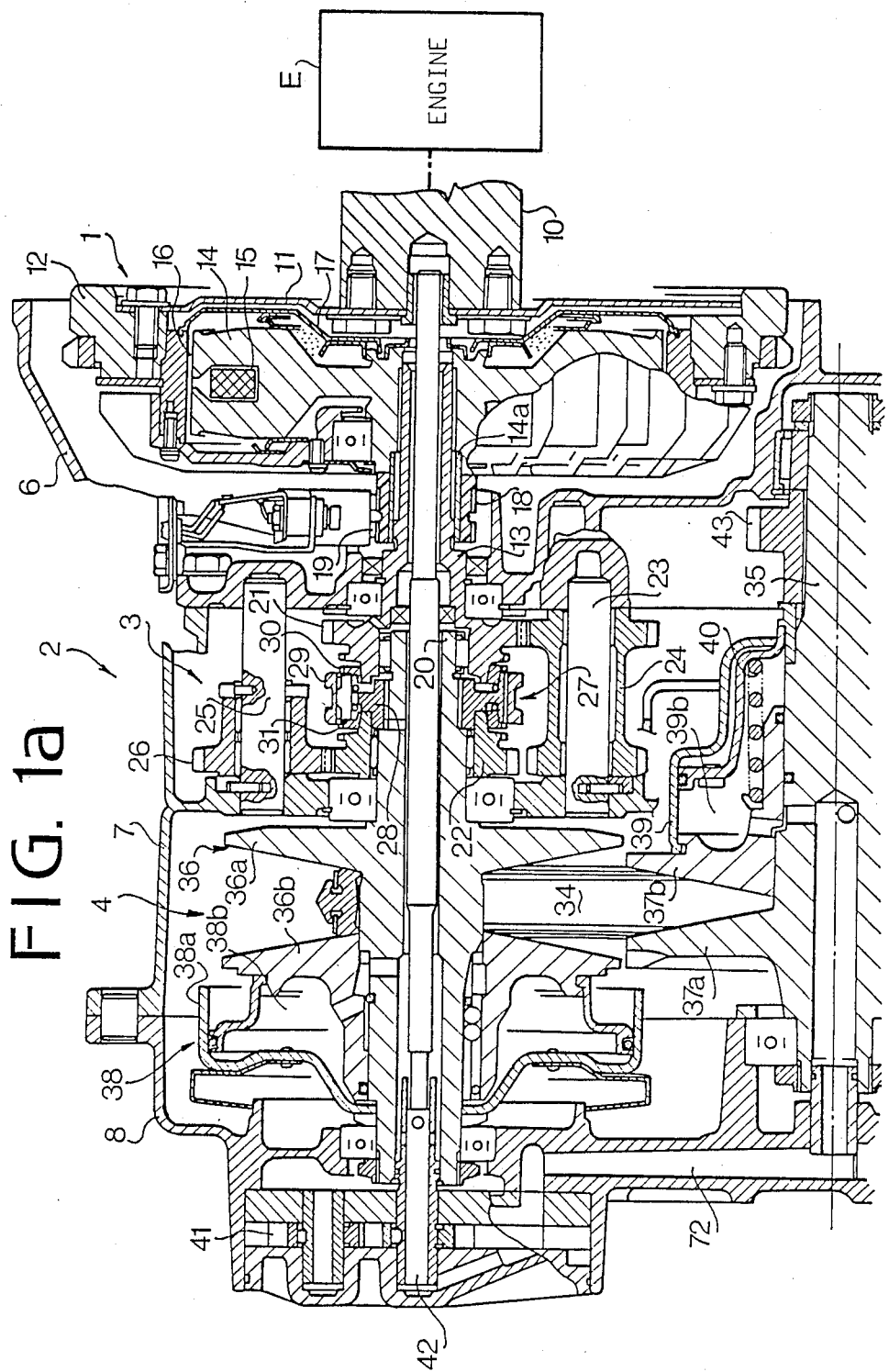
FIGS. 1a 1b a sectional view of the continuously variable belt-drive transmission to which the present invention is applied.
Figure 1B:
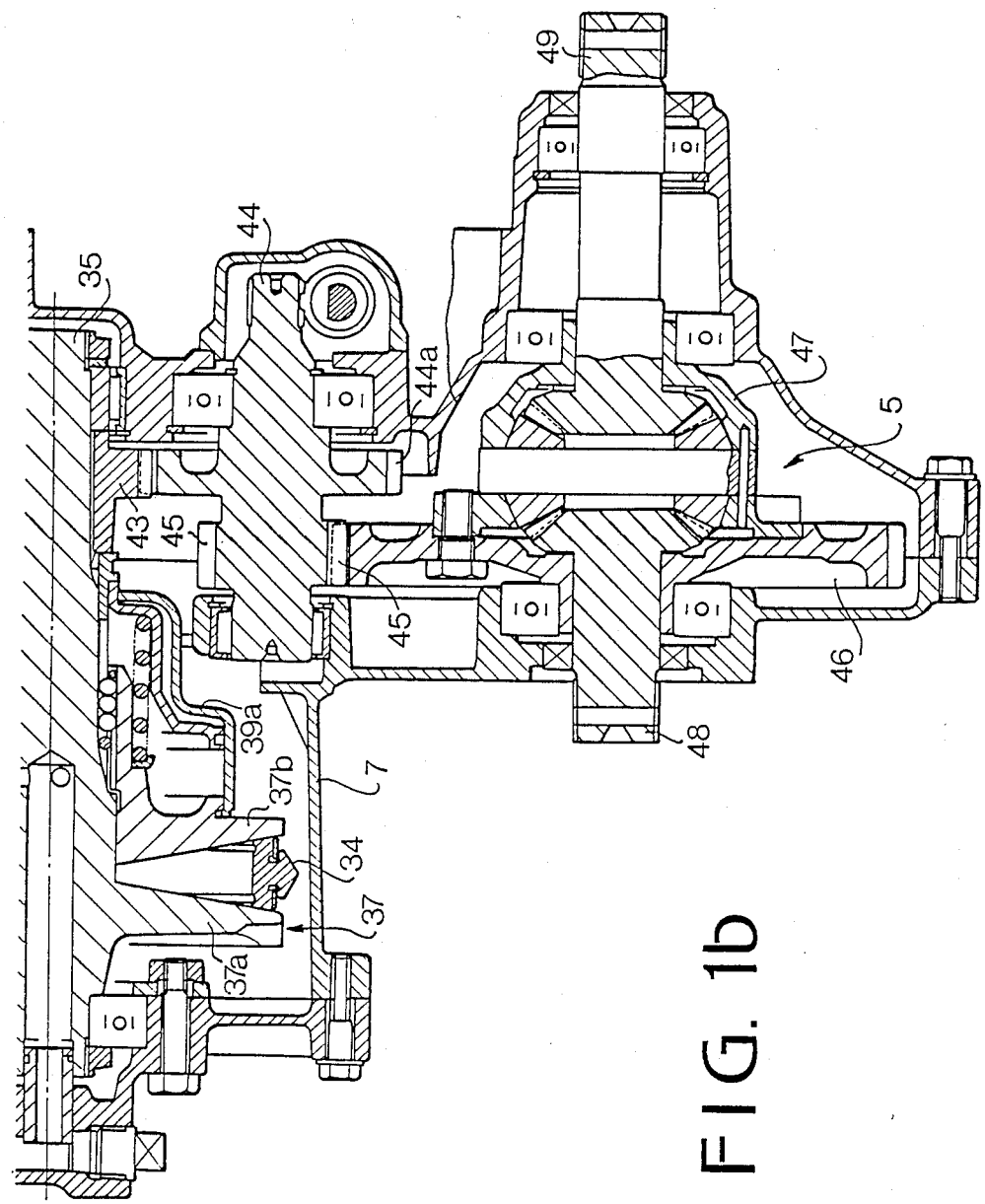

FIGS. 1a and 1b show a power transmission system with a continuously variable belt-drive automatic transmission for a motor vehicle, to which the present invention is applied. An engine E is transversely mounted on a motor vehicle at a front portion thereof. The power transmission system comprises an electromagnetic powder clutch 1, a selector device 3, an infinitely variable belt-drive transmission 4, and a final reduction device 5 for front wheels of the vehicle. The electromagnetic powder clutch 1 is provided in a housing 6. The selector device 3, the transmission 4 and the final reduction device 5 are provided in a main housing 7 and a side housing 8. A crankshaft 10 of the engine E is connected to an annular drive member 12 through a drive plate 11 of the electromagnetic powder clutch 1. The electromagnetic powder clutch 1 comprises a driven member 14, a magnetizing coil 15 provided in the driven member 14. The driven member 14 has its outer periphery spaced from the inner periphery of the drive member 12 by a gap 16. Magnetic powder material is provided in the gap 16. The driven member 14 is secured to an input shaft 13 of the belt-drive transmission 4. A holder 14a secured to the driven member 14 carries slip rings 18 which are electrically connected to the coil 15. The coil 15 is supplied through brushes 19 and slip rings 18 with current from a control circuit (not shown) for the electromagnetic powder clutch 1.

When the magnetizing coil 15 is excited by the clutch current, the driven member 14 is magnetized to produce a magnetic flux passing through the drive member 12. The magnetic powder is aggregated in the gap 16 by the magnetic flux and the driven member 14 is engaged with the drive member 12 by the powder. On the other hand, when the clutch current is cut off, the drive and driven members 12 and 14 are disengaged from one another.

The selector device 3 is provided between the input shaft 13 and a main shaft 20. The main shaft 20 is cylindrical and is disposed coaxially with the input shaft 13. The selector device 3 comprises a drive gear 21 integral with input shaft 13, reverse driven gear 22 rotatably mounted on the main shaft 20, and a synchronizer 27 mounted on the main shaft 20. The drive gear 21 meshes with one of counter gears 24 rotatably mounted on a shaft 23. Another gear of the counter gears 24 engages with an idler gear 26 rotatably mounted on a shaft 25, which in turn engages with the driven gear 22.

The synchronizer 27 comprises a hub 28 secured to the main shaft 20, a synchronizer sleeve 29 slidably engaged with the hub 28 with splines, and synchronizer rings 30 and 31. The synchronizer sleeve 29 is adapted to engage with splines of the drive gear 21 or with splines of driven gear 22 through rings 30 or 31.

At a neutral position (N range) or a parking position (P range) of a selector lever 117 (FIG. 2b), the sleeve 29 does not engage either gear, so that the main shaft 20 is disconnected from the input shaft 13. When the sleeve 29 is engaged with the gear 21, the input shaft 13 is connected to the main shaft 20 through the gear 21 and synchronizer 27 to provide a drive range position (D range) and a high engine speed driving range (Ds range). When the sleeve 29 is engaged with the gear 22, the input shaft 13 is connected to the main shaft 20 through gears 21, 24, 26 and 22 to provide a reverse drive range position (R range).

The main shaft 20 has an axial passage in which an oil pump driving shaft 42 connected to crankshaft 10 is mounted. In the transmission 4, an output shaft 35 is provided in parallel with the main shaft 20. A drive pulley 36 and a driven pulley 37 are mounted on shafts 20 and 35. A fixed conical disc 36a of the drive pulley 36 is integral with main shaft 20 and an axially movable conical disc 36b is axially slidably mounted on the main shaft 20. The movable conical disc 36b also slides in a cylinder 38a secured to the main shaft 20 to form a servo device 38 having a chamber 38b.

A fixed conical disc 37a of the driven pulley 37 is formed on the output shaft 35 opposite the movable disc 36b and a movable conical disc 37b is slidably mounted on the output shaft 35 opposite disc 36a. The movable conical disc 37b also slides in a cylinder 39a secured to the output shaft to form a servo device 39. A chamber 39b of the servo device 39 is communicated with an oil pump 41 through a passage 72. A spring 40 is provided to urge the movable conical disc 37b to the fixed conical disc 37a. A drive belt 34 engages With the drive pulley 36 and the driven pulley 37. The movable disc 36b has an area exposed to the line pressure which is larger than the corresponding area of the movable disc 37b.

Secured to the output shaft 35 is a drive gear 43 which engages with an intermediate reduction gear 44a on an intermediate shaft 44. An intermediate gear 45 on the intermediate shaft 44 engages with a final gear 46. Rotation of the final gear 46 is transmitted to axles 48 and 49 of front driving wheels of the vehicle through a differential 47.

Figure 2A:
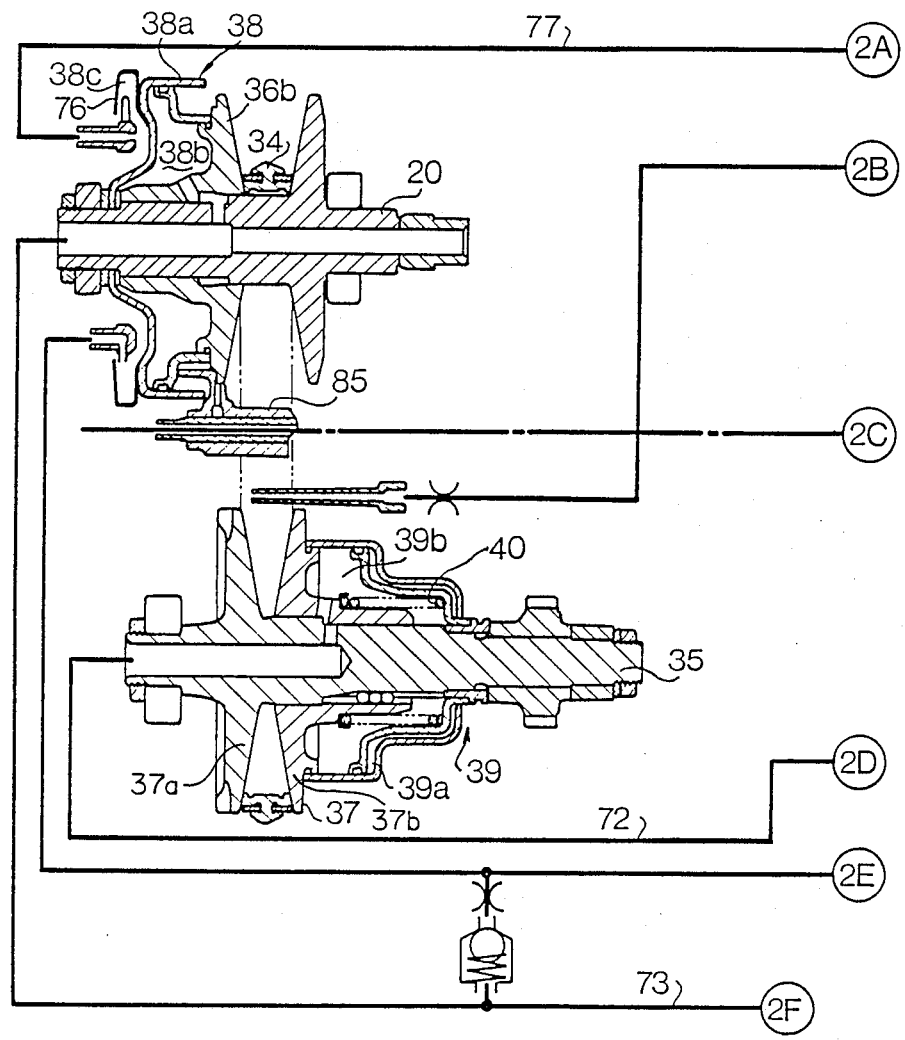

FIGS. 2a to 2c show a hydraulic control circuit according to the present invention. The circuit is provided with a pressure regulator valve 80 and a transmission ratio control valve 90.

The pressure regulator valve 80 comprises a valve body 81, a spool 82, and a spring 84 provided between a spring retainer 83 and one end of the spool 82 for urging the spool to the left.

The transmission ratio control valve 90 comprises a valve body 91, a spool 92, an operating plunger 93, and a spring 94 provided between the spool 92 and the plunger 93. Oil in an oil reservoir 70 is supplied to a port 81b of the pressure regulator valve 80 through a passage 71 by the pump 41. An oil passage 72 connected to the passage 71 is communicated with the driven pulley servo chamber 39b. The passage 71 is further communicated with the drive pulley servo chamber 38b through ports 81c and 81g of the regulator valve 80, a passage 87, ports 91c and 91b of the transmission ratio control valve 90 and a passage 73. Oil flows back from a port 81d of the regulator valve 80 to the inlet of the pump 41 through drain passages 74 and a relief valve 78. A drain port 91d of the transmission ratio control valve 90 is communicated with the oil reservoir 70 through a drain passage 75 and a check valve 78a.

The drive pulley cylinder 38a has an annular inside groove 38c in which a rotation speed sensor 76 in the form of a pitot tube is provided for measuring the speed of the oil in the groove 38c, that is the speed of the main shaft 20 which is proportional to the engine speed. The pitot pressure produced by the rotation speed sensor 76 is applied to end chambers 81a and 91a of the valves 80 and 90 through passages 77 and 77a.

The port 81d of the pressure regulator valve 80 is communicated with a select position detecting valve 110 upstream of the relief valve 78 through a passage 79 and further with an actuator 120 for the transmission ratio control valve 90 through a passage 88.

A sensor shoe 85 for detecting the actual transmission ratio is slidably mounted on a lubricating oil pipe 86 which is parallel with the axis of the spool 82. A bolt 85a secured to a lever receiving end 85b of the sensor shoe 85 engages with an end of a bolt 83a secured to the spring retainer 83, and the other end of the sensor shoe 85 engages with an outside periphery 36d of the movable disc 36b. Thus, the position of the movable disc 36b which means the transmission ratio during the operation is transmitted to the spool 82 through the spring 84. At the end of the valve body 81 opposite to the spring 84, pitot pressure is applied to the end chamber 81a, and oil pressure is applied to port 81b through the passage 71. A port 81e which is provided between the chamber 81a and the port 81b for preventing the leakage of the oil dependent on the line pressure, is communicated with the oil reservoir 70 through drain passages 74a. The port 81c is communicated with the port 81d through a chamber formed on a land 82a of the spool 82 when the spool is shifted to the right, so that the line pressure can be regulated.

Thus, the spool 82 is applied with the pitot pressure and oil pressure so as to be moved in the direction to open the port 81d, whereas the elastic force of the spring 84 corresponding to the transmission ratio detected by the sensor shoe 85 urges the spool 82 in the direction to close the port 81d. Accordingly, high line pressure generates at the port 81g at a low engine speed with a large transmission ratio. The sensor shoe 85 is moved to the right in FIG. 2b as the transmission ratio decreases, reducing the force of the spring 84 to lower the line pressure. The line pressure exerts on the belt 34 at a proper force dependent on the transmission ratio so as not to cause the belt to slip on the pulleys.

The transmission ratio control valve 90 further comprises an annular groove 92a formed on the spool 92 so as to communicate the port 91b with the port 91c or port 91d for supplying or discharging line pressure to or from the drive pulley servo chamber 38b in dependency on the position of the spool 92. A regulator spring 97 is provided between the operating plunger 93 and a retainer 96 securely mounted on a projecting end of a modulator plunger 95 which is slidably provided in an axial cavity 92c in the spool 92. A spring 98 is provided between a flange of the plunger 95 and a retainer 92b of the spool 92. The force of the regulator spring 97 is determined by the projecting extent of the plunger 95 from the spool 92 and the position of the plunger 95 is dependent on the line pressure at the port 91c which is supplied to a space defined by the flange of the plunger 95 and the inside wall of the spool 92 through a small aperture 99.

The plunger 93 is slidably mounted in the valve body 91 and has an axial cavity 93c. A rod 101 is axially slidably mounted in the valve body 91, and a flange 103 of the rod 101 is slidably engaged with the wall of the cavity 93c. A small spring 102 is provided between the flange 103 and the plunger 93. The pitot pressure is applied to a chamber 91e through a port 92d. The cavity 93c is supplied with the pitot pressure through a port 91f and a passage 106 having an orifice 105. A spring 107 is provided between an end of the spool 92 and the valve body 91 to adjust the load on the spring 102. An end of the rod 101 engages with a cam 100 which is operatively connected to an accelerator pedal 100a of the vehicle so as to be rotated in dependency on the depression of the pedal 100a.

When the spool 92 is moved by the pitot pressure to communicate the port 91c with port 91b, the line pressure is applied to the servo chamber 38b of the drive pulley 36 to upshift the transmission. On the other hand, when the port 91b communicates with the port 91d, the chamber 38b is drained to downshift the transmission.

The select position detecting valve 110 comprises a valve body 111, a valve 113 having a drain aperture 112 which is slidably mounted in the valve body 111 and a spring 114 for urging the valve 113 to a cam 115 which rotates according to the position of the selector lever 117. The cam 115 has a lobe 115a which is corresponding to D, N and R range positions, and lobes 115b formed in the both sides of the lobe 115a, corresponding to P and Ds range positions. At the D, N and R range positions, the lobe 115a pushes the valve 113 in the direction to close the drain aperture 112, so that actuating oil pressure is built up. At the P and Ds range positions, the valve 113 moves outwardly to open the drain aperture 112 to drain the oil therefrom, so that the oil pressure in the passages 88 and 79 is reduced. At that time the oil pressure in the oil passage 88 decreases gradually, because of an orifice 116 provided in the oil passage 88. The oil pressure is applied to an actuator 120.

The actuator 120 comprises a cylinder 121, a piston 122 which is slidably mounted in the cylinder 121, and a spring 123 for urging the piston 122 toward piston chamber 124 to which actuating oil pressure is applied through a passage 88. Further, a connecting rod 125 is secured to an outer end of a rod 122a of the piston 122 and is engageable with a pin 108 on the rod 101 of the transmission ratio control valve 90. At the P range or Ds range, since no actuating oil pressure exists, piston 122 presses the rod 101 a predetermined stroke by the spring 123 to the left in FIG. 2c, through the rod 125, controlling the transmission zone to the side of high engine revolution. Thus, the releasing of the accelerator pedal 100a at Ds range causes downshifting of the transmission, so that the engine braking occurs. Further, a correction lever 128 rotatably supported by a pin 127 is provided between the sensor shoe 85 and the rod 125, in order to correct the characteristics in the Ds range. An end of the lever 128 yieldably engages with the end 85b of the shoe 85 by a spring (not shown), and the other end engages with the rod 125 only when piston 122 of the actuator 120 moves to the left. When the transmission is downshifted to shift the disk 36b to the left, the sensor shoe 85 pushes the end of lever 128 to rotate it. Thus, the rod 125 and piston 122 are moved toward the right as the transmission ratio increases, and, at the maximum transmission ratio, the piston 122 is returned to the right end position.

Figure 3A:
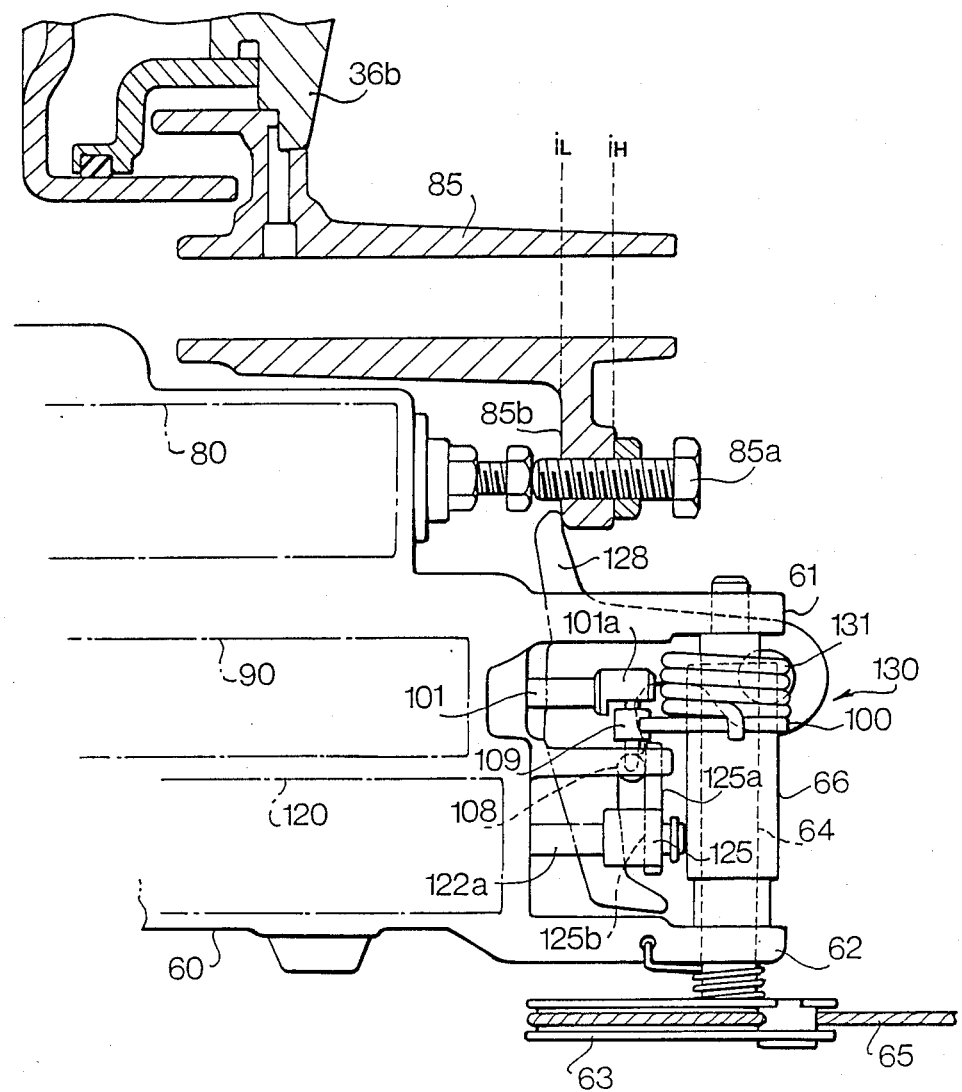
FIG. 3a is a plan view of a modulator device and a correction lever of the present invention.

Referring to FIG. 3a, the line pressure control valve 80, transmission ratio control valve 90 and actuator 120 are disposed in parallel in that order in a frame 60. The sensor shoe 85 is disposed outside of the frame 60 adjacent the line pressure control valve 80, and a modulator device 130 for the transmission ratio control valve 90 is disposed outside of the frame 60 adjacent to the transmission ratio control valve 90 and to the actuator 120, perpendicular thereto. The modulator device 130 comprises an inner shaft 64 rotatably supported by a pair of supporting arms 61 and 62 of the frame 60, and a tubular outer shaft 66 rotatably mounted on the inner shaft 64 between the support arms 61 and 62. The cam 100 is securely mounted on the outer shaft 66. A lever 63 which is connected to the accelerator pedal through a cable 65 is securely mounted on the inner shaft 64 at the outer side of the arm 62. Disposed around the outer shaft 66 is a torsion spring so as to rotate the inner shaft 64 in accordance with the operation of the cam 100.

The rod 101 of the transmission ratio control valve 90 has a head portion 101a. A pin 108 is projected from the head portion 101a and a roller 109 on which the cam 100 abuts is rotatably mounted on the pin 108. The pin 108 is extended to a lug 125a horizontally projected from the connecting rod 125. The lug 125a is arranged to engage with the pin 108 when the rod 122a of the actuator 120 is moved to the left by spring 123. A lug 125b is formed on the underside of the connecting rod 125 so as to abut against the lever 128.

Figure 3B:
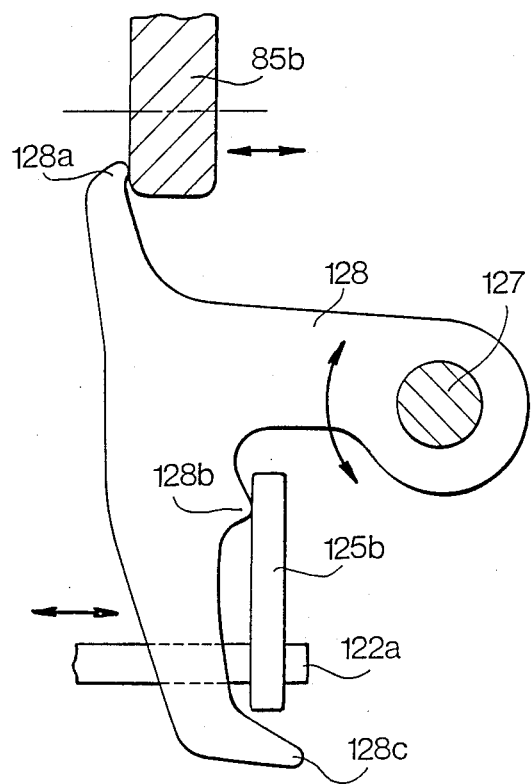
FIG. 3b view of the correction lever.

As shown in FIG. 3b, the correction lever 128 has an anchor-like shape in plan view, swingably supported by the pin 127 at a shank portion. The lever 128 has a first lobe 128a at an end of a short arm, a second lobe 128b for an extremely low vehicle speed range formed on a long arm adjacent the shank, and a third lobe 128c for a low and middle vehicle speed range at an end of the long arm. The first lobe 128a is engageable with the end 85b of the sensor shoe 85 and the second and third lobes 128b and 128c are selectively engageable with the lug 125a of the connecting rod 125. The distance between the lobes 128b and 128c is substantially equal to the length of the lug 125a so that one of the lobes 128b and 128c engages with the lug 125a immediately before the other lobe disengages from the lug 125b. Accordingly, the engagement state changes without interruption.

The projecting length of the third lobe 128c is larger than that of the second lobe 128b, so that the lever ratio of the correction lever 128 changes depending on the vehicle speed. That is to say when the second lobe 128b is in engagement with the lug 125b, the lever ratio of the correction lever 128 is small. Therefore, as shown in FIGS. 4b and 4c displacement $\Delta x$ of the lug 125a with respect to displacement $\Delta i$ of the sensor shoe 85 is smaller than displacement $\Delta x$ when the lobe 128c engages with the lug 125 (FIG. 4c).

Figure 5:
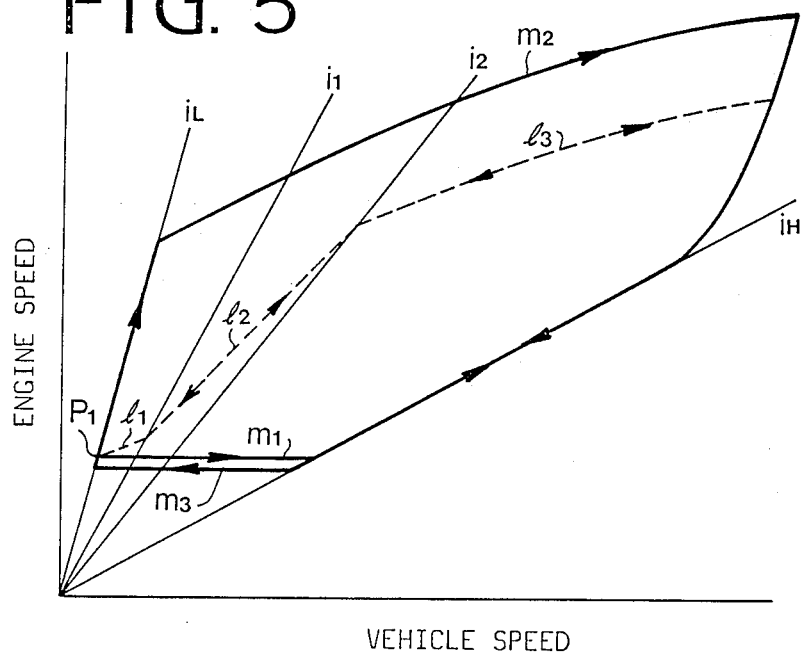
FIGS. 5 and 6 relationships between the vehicle speed and the engine speed in the control systems of the present invention and of a prior art, respectively.
Figure 6:
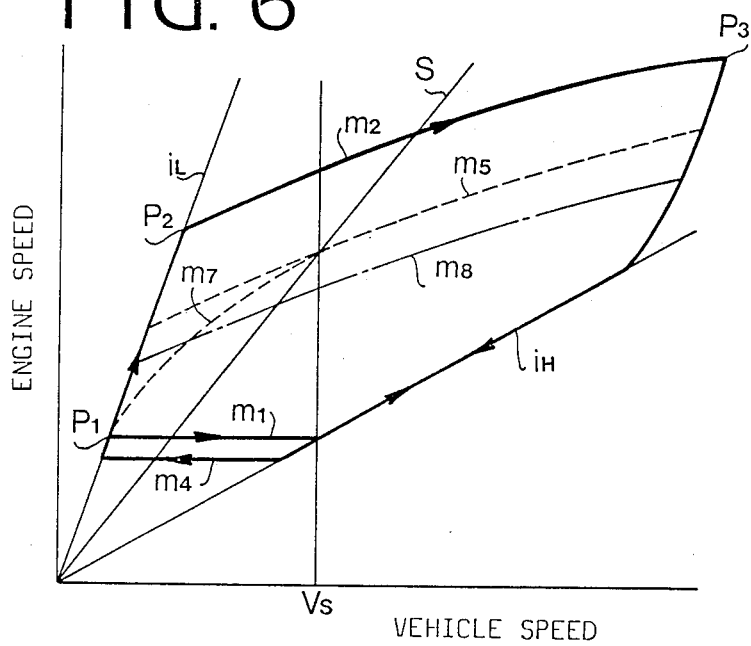

The operation of the system is described hereinafter. While the vehicle stops, the driven pulley servo chamber 39b is supplied with the line pressure adjusted by the pressure regulator valve 80 through the passages 71 and 72, and the drive pulley servo chamber 38b is drained, since the spool 92 is at the left end position by the spring 94. Thus, the driving belt 34 engages with the driven pulley 37 at a maximum running diameter to provide the largest transmission ratio iL (low speed stage) in the graph shown in FIG. 5. On the other hand, the selector lever 117 is at the N range position to select the N range, so that the drain aperture 112 of the select position detecting valve 110 is closed. When the D range is selected, the input shaft 13 and the main shaft 20 are connected to each other in the selector device 3 by the selector lever 117. Since oil pressure is applied to the piston chamber 124 of the actuator 120, the rod 122a is pushed by the piston 122 thereby disengaging the rod 125 from the pin 108 of the transmission ratio control valve 90. Accordingly, rod 101 of the transmission ratio control valve 90 is operated only in accordance with the operation of the cam 100 operatively connected to the accelerator pedal 100a.

When the accelerator pedal is depressed and engine speed exceeds a predetermined value, the electromagnetic powder clutch 1 is excited by clutch current, thereby transmitting the engine power to the drive pulley 36. The power of the engine is transmitted to the output shaft 35 at the largest transmission ratio by the driving belt 34 and driven pulley 37, and further transmitted to axles of the driving wheels of the vehicle. Thus, the vehicle is started.

When the pitot pressure rises, the spool 92 is shifted to the right, so that the line pressure is applied to the servo chamber 38b to move the disc 36b to the right. Thus, the transmission starts to upshift to the smallest transmission ratio iH along a line between a transmission ratio changing line $m_1$ showing the characteristic of the transmission ratio when the throttle valve is completely closed, and a transmission ratio changing line $m_2$ showing the characteristic of the transmission ratio at the wide-open throttle.

When the accelerator pedal is released, the vehicle speed reduces along the smallest transmission ratio iH. When the engine speed decreases below a predetermined low engine speed, the transmission starts to downshift along a line $m_3$.

At that time, since the accelerator pedal 100a is released, the cam 100 is substantially at the vertical position. Accordingly, the rod 101 projects out of the valve body 91 so that minimum load is exerted on the spring 94. In the D range, although the modulator plunger 95 is shifted to the right by the line pressure applied to the port 91c, no load is exerted on the regulator spring 97. Thus, the spool 92 is balanced by the minimum load on the spring 94 and pitot pressure applied to the chamber 91a so as to upshift or downshift the transmission. As a result, the engine speed is kept constant as shown by the transmission ratio changing lines $m_1$ and $m_3$.

The operation when the Ds range is selected is described hereinafter.

When the selector lever 117 is at the Ds position to select the Ds range, the drain aperture 112 of the select position detecting valve 110 is opened. Accordingly, the piston chamber 124 is drained so that the spring 123 urges the connecting rod 125 to press the rod 101 through the piston 122 and the rod 122a. Thus, the operating plunger 93 is pushed to the left regardless of the position of the cam 100.

At the largest transmission ratio iL, since the distance between the discs 36a and 36b of the drive pulley is at the maximum, the sensor shoe 85 is at a left end position. As shown in FIG. 4a, the first lobe 128a engages with an edge portion of the end 85b of the sensor shoe 85, thereby locating the other end, namely the third lobe 128c, at the extreme right position apart from the lug 125b. Accordingly, the second lobe 128b for extremely low vehicle speed abuts against the lug 125a so as to prevent the connecting rod 125 from shifting further to the left. Therefore, the operating plunger is pressed only by the cam 100 with a minimum load, in the same manner as the D range. Thus, the transmission ratio starts to change at a point P1 which is the same as the position at which lowest transmission ratio changing line $m_1$ starts in the D range. The transmission is upshifted along a line $l_1$ having a small inclination angle.

As the transmission ratio reduces, the sensor shoe 85 is shifted to the right. The lever 128 is clockwisely rocked by the force of the spring 123, following the sensor shoe 85, so that the second lobe 128b is displaced to the left, thereby pushing the piston 122 of the actuator 120 into the piston chamber 124. Accordingly, the lug 125a of the connecting rod 125 engages with the pin 108 of the transmission ratio control valve 90 to press the rod 101 and the operating plunger 93. Therefore, the load exerted on the spring 94 is increased to move the spool 92 in the direction to upshift the transmission, so that the engine speed is increased. The displacement $\Delta x$ of the plunger 93 caused by the displacement of the lug 125a with respect to the displacement $\Delta i$ of the shoe 85 is small so that the transmission ratio is controlled in the extremely low vehicle speed range to restrain the increase of the engine speed as shown by line $l_1$ in FIG. 5.

When the lever 128 passes a position shown in FIG. 4b, the second lobe 128b disengages from the lug 125b, at the same time the lug 125b engages the third lobe 128c as shown in FIG. 4c, at a predetermined transmission ratio $i_1$. Accordingly, the lug 125b is shifted to the left in accordance with the displacement of third lobe 128c, thereby pressing the rod 101 to the left into the valve body 91. Thus, the engine speed increases along a line $l_2$, upshifting the transmission.

Since the displacement $\Delta x$ of the plunger 93 in the middle and low vehicle speed range is larger than the displacement $\Delta x$ of FIG. 4b, the transmission is quickly upshifted so as to rapidly increase the engine speed as shown by the line $l_2$. Thus, accelerability of the vehicle is improved.

When the transmission ratio reaches a predetermined ratio $i_2$, the piston 122 of the actuator is located at the left end position. Therefore, the lever 128 is held at the same position so that a predetermined large force of the spring 123 is exerted on the rod 101 of the transmission ratio control valve 90. Accordingly, the transmission ratio is changed along a line $l_3$ appropriate for the Ds range, that is, the high engine speed range.

When the Ds range is selected while the vehicle is decelerating by releasing the accelerator pedal, the transmission is downshifted to the line $l_3$ by the operation of the actuator 120 so that engine brake is effectively operated. At that time, the correction lever 128 is held at a position, for example the position of transmission ratio $l_2$ so that when the transmission is further downshifted, the lug 125b engages with the lever 128. Accordingly, as the transmission is downshifted along the transmission ratio changing line $l_2$, the engine speed is decreased, thereby reducing the engine braking effect. Thus, at the extremely low engine speed, the engine braking effect is greatly reduced.

The present invention may be modified so as to control the transmission ratio also at the middle engine speed range, thereby changing the accelerability and the engine braking effect. Furthermore, the transmission ratio may be controlled to have a characteristic of a continuous exponential function.

From the foregoing, it will be understood that the present invention provides a control system for a continuously variable transmission where the engine braking effect is not excessively effected in an extreme low vehicle speed range, and further fluctuation of engine speed can be reduced, so that the driveability of the vehicle can be improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a control system for a continuously variable transmission for transmitting the power of an automotive engine to driving wheels of a vehicle, the transmission comprising a driving pulley having a hydraulically shiftable first disc and a first hydraulic cylinder for operating the disc, a driven pulley having a hydraulically shiftable second disc and a second hydraulic cylinder for operating the second disc, a belt engaged with both pulleys, the control system comprising a hydraulic circuit having a pump for supplying oil and a drain passage connected between a transmission ratio control valve and an oil reservoir for draining the oil, said transmission ratio control valve having a plunger slidably mounted in a valve body, a spool slidably mounted in the valve body for controlling the oil to be supplied to the cylinder of the drive pulley and the oil to be drained from the cylinder of the drive pulley to the drain passage so as to change the transmission ratio of the transmission, and at least one spring between the plunger and the spool, a cam operatively connected with an accelerator pedal of the vehicle for shifting the plunger in accordance with depression of the accelerator pedal, shifting means for shifting the spool dependency on engine speed to compress the spring, thereby changing the transmission ratio of the transmission, actuating means responsive to the selection of a high engine speed driving range for shifting the plunger to increase load on the spring, and a correcting lever for controlling operation of the actuating means in accordance with the transmission ratio in a larger transmission ratio range than a first predetermined transmission ratio, the improvement in said control system wherein said correcting lever comprises:
means for controlling the operation of said actuating means for gradually changing the engine speed in accordance with the transmission ratio in a larger transmission ratio range than a second predetermined transmission ratio, and for rapidly changing the engine speed in accordance with the transmission ratio in a smaller transmission ratio range than the second predetermined transmission ratio; wherein
said second predetermined transmission ratio being larger than said first predetermined transmission ratio.

2. The system according to claim 1, wherein
said actuating means comprises:
an actuator; and
a connecting rod operated by the actuator so as to shift the plunger;
said connecting rod having a lug engageable with said controlling means, so as to control operation of the plunger by the actuator and the controlling means via the connecting rod.

3. The system according to claim 2, wherein said controlling means comprises:
a first lobe formed on the correcting lever;
a second lobe formed on the correcting lever disposed nearer a center of rotation of the correcting lever than said first lobe and spaced a predetermined distance away from the first lobe.

4. The system according to claim 3, wherein one of the first and second lobes is engageable with the lug of the connecting rod immediately before the other of said lobes disengages from said lug, whereby engagement state of said lug with said lobes changes without interruption.

5. The system according to claim 3, wherein said first lobe has a projecting length larger than that of said second lobe, whereby lever ratio of the correcting lever changes depending on vehicle speed.

6. The system according to claim 3, further comprising
a sensor shoe engaging said second disc, and
said controlling means comprises a third lobe formed on the correcting lever engageable with said sensor shoe for controlling pivoting of said correcting lever in accordance with actual transmission ratio of said transmission.

* * * * *